(12) United States Patent
Buchanan et al.

(10) Patent No.: US 7,450,505 B2
(45) Date of Patent: Nov. 11, 2008

(54) SYSTEM AND METHOD FOR TOPOLOGY CONSTRAINED ROUTING POLICY PROVISIONING

(75) Inventors: James H. Buchanan, Ottawa (CA); Li Mo, Plano, TX (US); Robert T. Gibson, Ottawa (CA); Alexander Choi, High River (CA)

(73) Assignee: Fujitsu Limited, Kawasaki (JP)

( * ) Notice: Subject to any disclaimer, the term of this patent is extended or adjusted under 35 U.S.C. 154(b) by 730 days.

(21) Appl. No.: 10/072,353

(22) Filed: Feb. 7, 2002

(65) Prior Publication Data
US 2002/0191541 A1 Dec. 19, 2002

Related U.S. Application Data (60) Provisional application No. 60/295,367, filed on Jun. 1, 2001.

(51) Int. Cl.
*G01R 31/08* (2006.01)
(52) U.S. Cl. .......................... 370/231; 370/252; 370/255
(58) Field of Classification Search ........................ None
See application file for complete search history.

(56) References Cited

U.S. PATENT DOCUMENTS

| | | | |
|---|---|---|---|
| 5,793,763 A | 8/1998 | Mayes et al. | |
| 5,881,243 A * | 3/1999 | Zaumen et al. | ............. 709/241 |
| 6,163,527 A | 12/2000 | Ester et al. | |
| 6,167,445 A | 12/2000 | Gai et al. | |
| 6,178,505 B1 | 1/2001 | Schneider et al. | |
| 6,226,748 B1 | 5/2001 | Bots et al. | |
| 6,226,751 B1 * | 5/2001 | Arrow et al. | ................... 726/15 |
| 6,339,595 B1 * | 1/2002 | Rekhter et al. | ............... 370/392 |
| 6,449,650 B1 | 9/2002 | Westfall et al. | |
| 6,526,056 B1 | 2/2003 | Rekhter et al. | |
| 6,539,483 B1 | 3/2003 | Harrison et al. | |
| 6,577,327 B1 * | 6/2003 | Rochford et al. | ............. 715/735 |
| 6,625,773 B1 | 9/2003 | Boivie et al. | |
| 6,633,563 B1 | 10/2003 | Lin et al. | |
| 6,701,358 B1 * | 3/2004 | Poisson et al. | ............... 709/223 |
| 6,751,729 B1 * | 6/2004 | Giniger et al. | ............... 713/153 |
| 6,760,330 B2 * | 7/2004 | Tahan | .......................... 370/389 |
| 6,765,591 B2 | 7/2004 | Poisson et al. | |
| 6,871,233 B1 | 3/2005 | Bearden et al. | |
| 6,880,127 B1 * | 4/2005 | Arquie | ........................ 715/735 |
| 6,915,351 B2 | 7/2005 | Tahan | |
| 6,944,183 B1 * | 9/2005 | Iyer et al. | .................... 370/466 |
| 6,959,006 B1 * | 10/2005 | Sarnikowski et al. | ........ 370/468 |

(Continued)

OTHER PUBLICATIONS

World Wide Web, http://www.cisco.com/unlvercd/cc/td/doc/product/rtrmgmt/vpnsc/mpls/1_1/user_gd/, Cisco Systems, "MPLS VPN User Guide", printed on Feb. 8, 2002, 1 page.

(Continued)

*Primary Examiner*—Robert W Wilson
(74) *Attorney, Agent, or Firm*—Gardere Wynne Sewell LLP (57) ABSTRACT

A system and method for topology constrained routing policy provisioning between a plurality of sites in a Virtual Private Network (VPN) is disclosed. The method comprises enabling graphically defining of relationships between the plurality of sites of the VPN; and automatically generating at least one routing rule for each site of the VPN based at least in part on the defined relationship.

29 Claims, 4 Drawing Sheets

U.S. PATENT DOCUMENTS

| | | | |
|---|---|---|---|
| 7,096,495 B1 * | 8/2006 | Warrier et al. | 726/15 |
| 2003/0039212 A1 | 2/2003 | Lloyd et al. | |
| 2005/0025069 A1 | 2/2005 | Aysan | |

OTHER PUBLICATIONS

World Wide Web, http://www.ietf.org/rfc/rfc2547.txt, E. Rosen, et al. "BGP/MPLS VPNs", Mar. 1999, pp. 1-24, printed on Feb. 6, 2002.

World Wide Web, http://www.ietf.org/internet-drafts/draft-tequila-sls-01.txt, Danny Goderis, et al., "Service Level Specification Semantics, Parameters and negotiation requirements", Jun. 2001, pp. 1-28, printed on Feb. 6, 2002.

World Wide Web, http://www.cisco.com/univercd/cc/td/doc/product/rtrmgmt/vpnsc/mpls/1_1/user_gd/, Cisco VPN Solutions Center. MPLS Solution User Guide, "Introduction to Cisco MPLS VPN Technology", 2000, pp. 1-1 to 1-18.

World Wide Web, http://www.cisco.com/univercd/cc/td/doc/product/rtrmgmt/vpnsc/mpls/1_1/user_gd/, Cisco VPN Solutions Center. MPLS Solution User Guide, "Getting Started with the MPLS VPN Solutions Center", 2000, pp. 3-1 to 3-46.

K. Muthukrishnan et al., "A Core MPLS IP VPN Architecture" [online], Sep. 2000 [retrieved on Dec. 21, 2005]. Retrieved from the Internet: URL: <http://www.rfc-archive.org/getrfc.php?rfc=2917>, pp. 1-15.

Chuck Semeria, "RFC 2547bis: BGP/MPLS VPN Hierarchical and Recursive Applications", Juniper Networks, Inc., Part No. 200014-0002, Jul. 2001, pp. 1-43.

"Part 3: Carrier sense multiple access with collision detection (CSMA/CD) access method and physical layer specifications", in: IEEE Std. 802.3, 2000 Edition, pp. 40-50.

Yates, Jennifer et al., "Reconfiguration in IP Over WDM Access Networks", AT&T Labs-Research, AT&T Shannon Laboratories, 4 pages. dated Mar. 2000.

Varadarajan, Suba et al., "Virtual Local Area Networks" [online], Aug. 14, 1997 [retrieved on Feb. 7, 2000]. Retrieved from the Internet: URL: http://www.cis.ohio-state.edu/-jain/cis788-97/virtual_lans/Index.htm>, pp. 1-12.

Peter Aswood-Smith et al., "Generalized MPLS Signaling—RSVP-TE Extensions" [online], Nov. 2000 [retrieved on Feb. 16, 2007]. Retrieved from the Internet: URL: http://tools.ietf.org/html/draft-ietf-mpls-generalized-rsvp-te-04> pp. 1-21.

Eric C. Rosen et al., "Multiprotocol Label Switching Architecture" [online], Jul. 2000 [retrieved on Feb. 16, 2007]. Retrieved from the Internet: URL: <http://tools.ietf.org/html/draft-ietf-mpls-arch-07> pp. 1-61.

* cited by examiner

View Import/Export Policy

Import Rules — Default: REJECT

| Rule # | Type | RD | RT | Site | VPN | IPv4 | Next Hop | Action | Comment |
|---|---|---|---|---|---|---|---|---|---|
| 1 | Auto | any | any | Site 3 | any | any | any | REJECT | No routes from self |
| 2 | Auto | D(101.3) | Tm(101.1) | any | any | any | any | ACCEPT | Import from Mesh |
| 3 | Auto | D(100.3) | Ts(100.2) | any | any | any | any | ACCEPT | Import from Spoke |

Local Export Rules — Default: REJECT

| Rule # | Type | RD | RT | Site | VPN | IPv4 | Next Hop | Action | Comment |
|---|---|---|---|---|---|---|---|---|---|
| 1 | Auto | any | any | any | Client Intranet | any | any | ACCEPT | |
| | | D(101.3) | Tm(101.1) | Site 3 | any | = | n/a | ACCEPT | Export to Mesh |
| 2 | Auto | any | any | any | Client Intranet | any | any | ACCEPT | |
| | | D(100.3) | Th(100.1) | Site 3 | any | = | n/a | ACCEPT | Export to Hub |

Remote Export Rules — Default: ACCEPT

| Rule # | Type | RD | RT | Site | VPN | IPv4 | Next Hop | Action | Comment |
|---|---|---|---|---|---|---|---|---|---|
| 1 | Auto | any | any | any | any | any | any | REJECT | Do not readvertise |

[ OK ]  [ Cancel ]  [ Apply ]  [ Default ]

SYSTEM AND METHOD FOR TOPOLOGY CONSTRAINED ROUTING POLICY PROVISIONING

CROSS-REFERENCE TO RELATED APPLICATIONS

This patent application claims the benefit of Provisional Patent Application, Ser. No. 60/295,367, entitled System and Method for Topology Constrained Routing Policy Provisioning, filed on Jun. 1, 2001, the disclosure of which is incorporated herein by reference.

TECHNICAL FIELD OF THE INVENTION

The present invention relates generally to the field of telecommunications and more particularly to a system and method for topology constrained routing policy provisioning.

BACKGROUND OF THE INVENTION

It is a unique aspect of a Virtual Private Network (VPN) that only certain sites are allowed to exchange packets with one another. Existing provisioning systems allow an operator of a service provider to configure the sites so that one site can talk to a second site but not to a third site. The service provider may be an ILEC (Incumbent Local Exchange Carrier), a CLEC (Competitive Local Exchange Carrier), an ICX (Incoming Exchange), an ISP (Internet Service Provider), and/or the like. In order to operate properly it is desirable that the provisioning system be aware of the rules governing the communication between different sites of a VPN and allow configuration of the VPN based on those rules.

Existing provisioning systems allow an operator to configure routing policy in a VPN. However, such provisioning of routing policy is based on mechanisms which require extra router ports or explicit IP address prefix knowledge to be encoded in the routing policy. Thus, the service provider has to allocate extra service ports unnecessarily and/or implement a costly and error prone provisioning task.

SUMMARY OF THE INVENTION

Accordingly, especially with the introduction of newer technologies, such as Border Gateway Protocol 4 (BGP) and Multi-protocol Label Switching (MPLS), there is a need in the art for a system and method for routing policy provisioning in a network, such as topology constrained routing policy provisioning in a Virtual Private Network (VPN), for example a BGP MPLS VPN. In the preferred embodiment, the present invention allows topology constrained routing policy provisioning in a VPN by capturing the provisioning operator's intent regarding the sites that are allowed to communicate with each other.

A system and method for provisioning routing relationships between customer sites constrained by the topology of the VPN is disclosed. In the preferred embodiment, this is accomplished by interpreting the desired VPN topology as specified by the provisioning operator, determining the desired routing policies between customer sites which would effect the desired relationship so as to restrict communications to only those sites which have the right to exchange traffic with one another. The routing relationships then take effect in the provider network.

The method comprises enabling graphically defining of relationships between the plurality of sites of the VPN and automatically generating at least one routing rule for each site of the VPN based at least in part on the defined relationship.

Accordingly, it is a technical advantage of an exemplary provisioning system of the present invention that it is capable of understanding, displaying, storing and configuring VPNs in a provider network.

It is another technical advantage of an exemplary embodiment provisioning system that it is capable of understanding, displaying, storing and configuring the VPN topology, preferably in terms of the sites which are interconnected by VPN components and the type of VPN components, wherein the topology of the VPN components specifies the topology or permitted communication relationships between the sites.

It is another technical advantage of an exemplary embodiment of the present invention that a system and method for constrained routing distribution employing learned route import, learned route export, and route reflector learned route readvertisement features facilitating flexible route distribution policy is disclosed. A notation and nomenclature for conveying import and export rules as used to provision the constrained routing distribution method is also disclosed.

It is yet another technical advantage of an exemplary embodiment provisioning system that it is capable of understanding and using VPN topology for each VPN to facilitate construction of rules, wherein the mesh and hub-spoke VPN components translate to a specific set of rules constraining routing distribution and therefore communications paths to only those other sites with permitted communication relationships as opposed to all sites reachable via an underlying shared packet switched network.

It is yet another technical advantage of an exemplary embodiment provisioning system that it is capable of facilitating tuning of import and export rules such that different VPN components may be configured to share routes and/or such that different components of a VPN may be configured to no longer share routes.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 1:
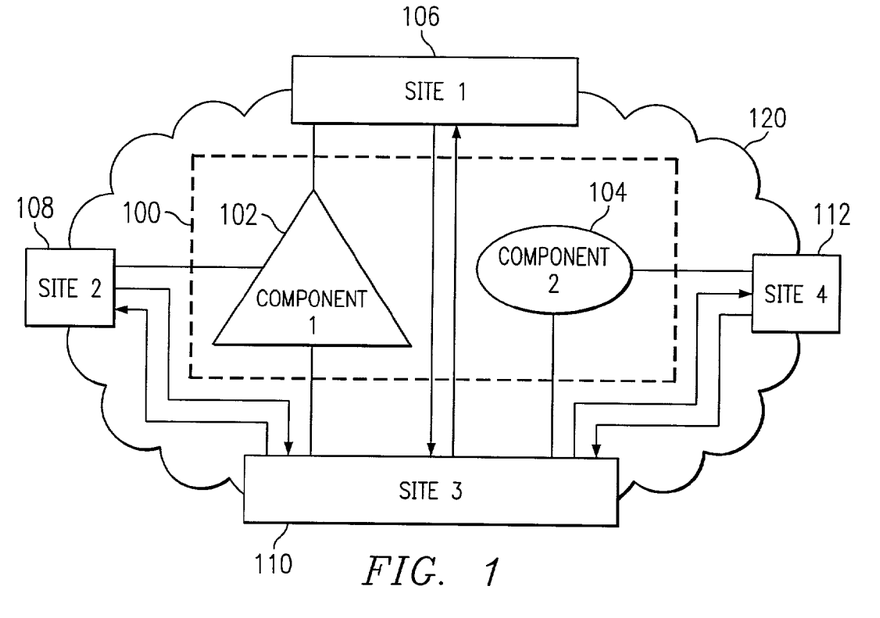
FIG. 1 shows the topology of an exemplary Virtual Private Network (VPN) according to a preferred embodiment of the present invention.

FIG. 1 shows the topology 100 of an exemplary network, for example an exemplary Virtual Private Network (VPN). As illustrated in FIG. 1 topology 100 comprises one or more VPN components 102 and 104. Each of the VPN components may have either a hub-spoke configuration or a mesh configuration. In the exemplary embodiment of FIG. 1 component 102 has a hub-spoke configuration and component 104 has a mesh configuration. Topology 100 also comprises one or more sites 106, 108, 110 and 112 connected by an underlying network 120.

It is a unique aspect of Border Gateway Protocol 4 (BGP) and Multi-protocol Label Switching (MPLS) VPNs that the VPN connectivity is provided by a dedicated provider edge-customer edge (PE-CE) peering relation combined with a shared packet-switched network operable to deliver packetized data between nodes/sites thereof in an appropriately formatted protocol, e.g. IP, User Datagram Protocol (UDP), and/or the like. The underlying network 120 may be embodied with any number of general transmission technologies. In an embodiment, the underlying network 120 is a fiber optic network carrying MPLS and IP formatted data therebetween and, accordingly, the nodes may be implemented as optical transport nodes although the particular transmission medium is irrelevant with regard to the scope of the invention. While the present invention contemplates an implementation on an optical network, the invention as described herein is not intended to be limited thereto and, accordingly, underlying network 120 may be any type of network capable of packet-switched data transmissions between various nodes thereof.

In the preferred embodiment, the BGP MPLS VPN topology is governed by constrained distribution of routing information between sites using the concept of Route Target attributes which are sent with routing updates. Any two sites of the VPN which are able to share routing information are said to be topologically related. If an underlying network transport mechanism, such as MPLS, exists to securely carry packets between sites that are topologically related, then the sites are able to communicate over the VPN.

Sites which are connected in a mesh configuration may exchange packets with one another. The mesh interconnection is useful for connecting sites, such as regional headquarters so that the different regional headquarters can exchange data with one another. In the preferred embodiment, a mesh VPN component employs one Route Target Tm(x). A BGP process serving each of the sites belonging to the mesh imports routes tagged with Route Target Tm(x) and exports routes tagged with Route Target Tm(x).

Sites which are connected in a hub-spoke configuration typically have restrictions on the exchange of packets. A site which is a hub may exchange packets with any spoke in that component, while a site which is connected as a spoke may only exchange packets with the hub. The hub-spoke arrangement is useful for connecting sites, such as sales offices in a particular region to the corresponding regional headquarters. In such an arrangement, the regional headquarters could be the hub and the sales offices could be the spokes. Thus, data from the sales office in a particular region can be transmitted to the regional headquarters from where it might be sent to other sales offices in the same region or to the headquarters of a different region.

In the preferred embodiment, a hub-spoke VPN component employs two Route Targets—Th(x) for the hub and Ts(y) for the spokes. The BGP process serving the hub site imports routes tagged with Ts(y) and exports routes tagged with Th(x). The BGP process serving the spoke site imports routes tagged with Th(x) and exports routes tagged with Ts(y).

In the exemplary embodiment shown in FIG. 1, site 1 is a spoke of hub-spoke VPN component 1; site 2 is a spoke of hub-spoke VPN component 1; site 3 is the hub of hub-spoke VPN component 1 and is also a member of mesh VPN component 2; and site 4 is a member of mesh VPN component 2. Thus, site 1 can only exchange packets with site 3; site 2 can only exchange packets with site 3; site 4 can only exchange packets with site 3; and site 3 can exchange packets with site 1, site 2, and site 4. Connections between sites and VPN components are representative of the VPN topology and connections between the sites reflect the constrained topology upon which provisioning may be based.

Route Targets may be used to describe the topology of a VPN, for example the permitted combination of sites which may communicate securely over the VPN. A Virtual Routing Forwarding (VRF) table associated with a particular site S is populated only with routes that lead to other sites which have at least one VPN in common with site S. This prevents communication between sites which have no VPN in common. Every VRF is associated with one or more Route Target attributes. These are carried in BGP as attributes of the route. Any route associated with a Route Target T is distributed to every Provider Edge (PE) router that has a VRF associated with Route Target T. When such a route is received by a PE router, it is eligible to be installed on those of the PE's VRFs which are associated with Route Target T. An Export Target is a Route Target that a PE router attaches to a route received from site S. An Import Target is a Route Target that a PE router uses to determine whether a route received from another PE router could be placed in the VRF associated with site S. A particular VPN IPv4 route is eligible for installation in a particular VRF if there is some Route Target which is both one of the route's Route Targets and one of the VRF's Import Target.

The topology of a BGP MPLS VPN is not immediately evident from the capabilities of the underlying transport network which may offer communication between all PE nodes. Therefore, an understanding of the application of Route Targets, their import and export control, and BGP protocol behavior is desirable to properly determine the topology of the BGP VPN or MPLS VPN. It is desirable that the provisioning system be aware of the rules governing communication between different sites of a VPN and allow configuration of the VPN based on those rules.

Preferably a Management and Control System (MCS) 201 (FIG. 2), which is preferably a client-server based software system, is utilized for topology constrained QoS (Quality of Service) and routing policy provisioning according to the preferred embodiment of the present invention. A user interface 200 associated with MCS 201 allows a provisioning operator to graphically create the topological relationship between different sites. User interface 200 preferably also allows the provisioning operator to graphically set-up QoS and routing relationships between the different sites. However, user interface 200 only allows QoS and routing relationships to be set-up based on the constraints of the underlying topology. Thus, by being aware of the rules corresponding to the topology, MCS 201 allows provisioning of QoS and routing relationships based on the topology. MCS 201 captures the provisioning operator's intent, performs the desirable validation and translation into routing rules for different sites of the VPN, stores the information in a database, and transmits it to the appropriate routers, switches and/or devices of the network.

A pointing device, such as a mouse, a trackball and/or the like, which controls a graphical pointer on a display may be used. The graphical pointer is used to provide feedback to the provisioning operator. Utilizing the pointing device, the provisioning operator may point to a desired selection and receive feedback by viewing the graphical pointer. Furthermore, pointing and clicking on a representation of a VPN element by keeping the button of the pointing device depressed would allow the provisioning operator to 'drag' the selected VPN element. Releasing the button of the pointing device would allow the provisioning operator to 'drop' the selected VPN element.

Figure 2:
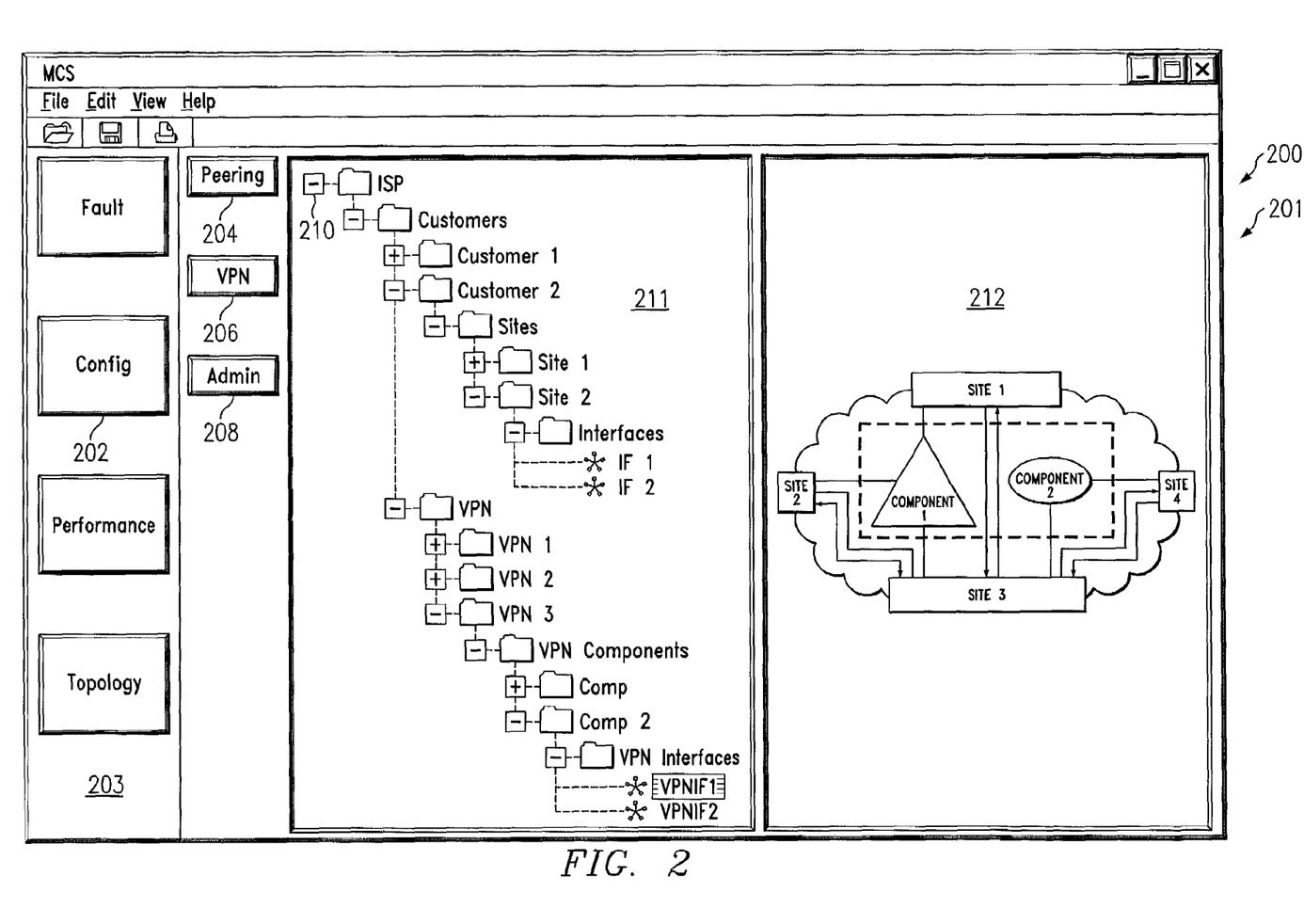
FIG. 2 shows an exemplary screen display of a preferred embodiment of a management and control system of the present invention.

FIG. 2 shows an exemplary screen display of the preferred embodiment MCS 201 of the present invention. User interface 200 of MCS 201 preferably comprises a configuration area 203, a customer area 211 and a display area 212. Preferably the VPN configuration capabilities are accessed by clicking on a Config icon 202. The configuration application preferably includes one or more tabs for selecting the Config task areas. For example, as illustrated, the configuration application includes three task areas—Peering 204, VPN 206 and Admin 208. Each task area preferably displays a VPN tree 210 in customer area 211 with the appropriate data included in the tree. Display area 212 to the right of VPN tree 210 can have different views depending on the object selected in VPN tree 210. The views may be list, graphical, no context, and/or the like.

FIG. 2 shows an exemplary screen display when the VPN tab 206 is selected. Within the context of the VPN tab, an operator can toggle between one or more views—VPN topology, VPN QoS, Topology/QoS Overlay, and/or the like. Preferably, the view can be changed by selecting the appropriate view under the "View" pull down menu.

VPN tree 210 shows a containment relationship of the various data objects in a VPN. Preferably when configuring VPNs, VPN tree 210 includes one or more of the following data categories: service provider, customers, sites, site interfaces, VPNs, VPN components, VPN interfaces, and/or the like. In the preferred embodiment, when the selected view is VPN QoS or Topology/QoS Overlay VPN tree 210 preferably contains QoS templates, for example, for differentiated services (DiffServ), policing, IP header classification, queuing parameters, and/or the like. Preferably the different data categories appear as folder icons on VPN tree 210. Object instances reside within the data category folder icon on VPN tree 210. Preferably there is no category folder for Service Provider as in the preferred embodiment the provisioning operator will be logged on as a representative of a particular Service Provider.

A list view displays the items contained within the current VPN tree node selection. For example, clicking on the Customers folder preferably displays a list of all customers in the folder, preferably one per row. Clicking on a tree leaf—for example, a specific Site Interface, displays the leaf as a single table row.

In the preferred embodiment, for VPN tab 206, the list view data for various tree elements is as shown in Table I:

TABLE I

| TREE DATA ELEMENT | LIST VIEW DATA |
| --- | --- |
| Customer | Name, Postal Address, Billing Address, Shipping Address, Contact Information |

TABLE I-continued

| TREE DATA ELEMENT | LIST VIEW DATA |
| --- | --- |
| Site | Name, IP Address, Contact, Route Distinguisher |
| Site Interface | Name, interface IP Address, Subnet Mask, Route Distinguisher |
| VPN | Name, ID, Type |
| VPN Component | Name, Component Number, Component Topology, Primary Route Target, Secondary Route Target |
| VPN Interface | VPN ID, VPN Component ID, Component Role, Primary (Boolean), Member Label |

A graphical view preferably shows the VPN components and the associated relationships for the most recently selected VPN. If the user clicks on a non-VPN data item in VPN tree 210, such as a customer, the most recently selected VPN remains on the graphical display. The individual VPN elements may be shown graphically. Thus, as shown in FIG. 1, a hub-spoke VPN component may be shown by a triangle; a mesh VPN component may be shown by a circle; and a site may be shown by a rectangle with a label in the center. Preferably a single click on a VPN component selects the corresponding entry in VPN tree 210 and a single click on a link between a site and a VPN component selects the corresponding VPN interface in VPN tree 210.

Utilizing the user interface of the present invention a VPN, a customer, and/or a site may be added by right clicking on a customer entry and making the appropriate selection from a pop-up menu. The details for the particular selection can then be filled in.

For example, a site interface may be added by right clicking on a site entry and making the appropriate selection from the pop-up menu. The details for the site interface can then be filled in. The site interface details window preferably contains one or more of the following data fields to be filled by the provisioning operator: Name, interface IP Address, Subnet Mask, Route Distinguisher, and/or the like. The default site interface name is the customer equipment name concatenated with the interface IP address. A site interface may be displayed on the graphical view by dragging and dropping one or more site interfaces from VPN tree 210 onto a VPN component on VPN tree 210 or display area 212.

When a site interface is added to a VPN component on the graphical view, the corresponding site graphic is added to the graphical view. A corresponding VPN interface is created in VPN tree 210 under the component. The name of the VPN interface defaults to VPNIF n where n is the next available integer.

A line designating a site's membership in a VPN component connects the site to the VPN component. If the VPN component is a hub-spoke VPN component, the first interface added becomes the hub and other interfaces become the spoke. If desired, however, the designation of an interface as a hub or a spoke can be changed. Also, if desired, a default communication channel, such as a hose, is added between the site and the VPN component. A default Policing template and DiffServ template are also preferably applied to the communication channel. For example, a default policing template may be for Best Effort (BE) traffic to the line rate and a traffic envelope of "any". Alternatively, user provisioned defaults may be used, if desired.

A VPN component may be added to an existing VPN entry by right clicking on a VPN entry and making the appropriate selection from the pop-up menu. The details for the VPN component may then be filled in. The VPN component details window preferably contains one or more of the following data fields to be filled by the provisioning operator: Name, Component Number, Component Topology, Primary Route Target, Secondary Route Target, and/or the like.

Figure 3:
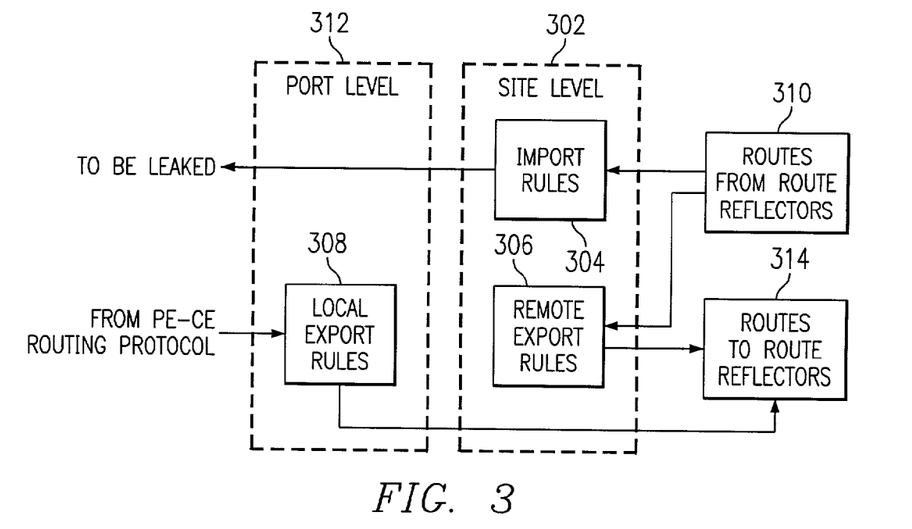
FIG. 3 shows a preferred embodiment block diagram for Route Target processing within the Provider Edge node servicing a site.

FIG. 3 shows a preferred embodiment block diagram for Route Target processing within the PE node servicing a site. For each customer site linked to a PE, preferably there is one External Virtual Private Router (EVPR) instance on that PE. The EVPR instance is responsible for one or more of the following operations: accepting Customer Edge (CE) route advertisement; accepting selected set of routes from a route reflector where the EVPR has VPN membership; distributing routing information to one or more route reflectors; and/or the like. Routing information acceptance is preferably based on the Route Targets (RTs) in the advertisement from the route reflectors. The accepted routes are preferably advertised to the CE router. If desired, the accepted routes may also be installed on the PE to CE user ports.

A route is preferably a set of Internet Protocol (IP) addresses and is specified by the common prefix of the IP addresses. Thus, for example, the route for a set of devices with IP addresses 10.0.0.1, 10.0.0.2, 10.0.0.3, and so on, is specified by the common prefix 10.0.0.*. A route reflector is preferably a router that has information about different routes. The information about different routes is preferably stored in a routing table associated with the router. Routing information from the route reflectors of a VPN may be accessed by different members of the VPN depending on the type of membership. Each VPN may have one or more route reflectors.

As shown in FIG. 3, at site level 302 there are two types of routing rules or routing filters for determining which routes are accepted and which routes are discarded by the EVPR instance on the PE serving the site: one or more import rules 304 and one or more remote export rules 306. At port level 312, there are one or more local export rules 308. Thus, in the preferred embodiment, three types of routing filters or routing rules are automatically generated and used for provisioning routing policy. Routes 310 from one or more route reflectors are received by import rules 304 and remote export rules 306. The received routes are filtered by import rules 304 and "leaked" to the corresponding PE-CE routing protocol. The routes accepted by the PE-CE peering protocol are preferably advertised to the CE and installed on the corresponding network processor. Routes from PE-CE routing protocol are received by local export rules 308. The received routes are filtered by local export rules 308 and the filtered routes 314 advertised to the route reflectors.

Import rules 304 preferably specify the set of routes received from one or more route reflectors to be leaked to the corresponding PE-CE routing protocol. The filtered routes may be advertised and installed on user ports assigned to a particular site. Preferably, no intra-site traffic is allowed. In the preferred embodiment, one or more of the following route information items is available from the route reflector—Route Distinguisher (RD), Route Target (RT), Site of Origin (SOO), VPN_ID, Internet Protocol version 4 (IPv4) Prefix, NextHopInfo and/or the like. Preferably, the information items are denoted as a 6-tuple {RD, RT, SOO, VPN_ID, IPv4 Prefix, NextHopInfo}

However, the invention is not so limited and if desired the information items may be expressed in any other suitable notation or nomenclature, for example, as a mathematical expression, as route map commands, and/or the like.

A RD is preferably used to allow creation of distinct routes to a common IPv4 address prefix. Preferably, the RD does not participate in the route distribution process. The RD can be a property of or be associated with one or more of the following: a site, a VPN, a VPN component and/or the like. In the preferred embodiment, the RD is allocated on a per VPN component basis. Since a RD is used to distinguish different IPv4 routes, preferably every route advertised to the route reflector will have one RD attached to the route per advertisement. Also, one route may be advertised multiple times by using different RDs and possibly with different next hop information. The association between routes and RDs is preferably performed via filters or rules.

A RT is preferably used to control route distribution in a VPN. As discussed above, preferably there are two types of VPN components as defined by MCS 201—a mesh VPN component and a hub-spoke VPN component.

In the mesh VPN component, the routing information is shared among all the member sites of the mesh. Preferably, one import RT and one export RT is assigned to each member site. If there is no routing policy imposed on the routing distribution, the import RT and the export RT are the same, which is the default behavior set by MCS. The import RT and export RT may be modified so that routing policies may be applied efficiently.

In the hub-spoke VPN component, spokes can only transmit packets to the hub and there is no direct inter-spoke communication. Preferably, the hub site is assigned one RT which is to be imported by the spokes and the spoke sites are assigned a different RT to be imported by the hub. The association between routes and RTs is preferably performed via filters or rules. A hub-spoke arrangement may be useful in the following cases: central services site, firewall site, and/or the like. A central services site services the spoke and thus, there is no requirement for inter-spoke communication. In the case of a firewall site, all the communication between the spokes has to go through the firewall site, which acts as a hub site. In order to enable firewall operations import and export rule mechanisms may be used.

The Site of Origin is preferably used to identify the original site the route is obtained from and once assigned is preferably not modified. The VPN_ID field is preferably used to relate the routes to the route reflector. For import rules, the VPN_ID field is preferably used to select the routes based on the VPN ID of the route reflector. For export rules, the VPN ID field is preferably used to select the route reflector the route is to be advertised to. For provisioning routing policy through MCS 201, NextHopInfo is preferably a specification of the user port to which the site interface is connected thereby leading to the next network hop towards a given IP prefix for packet transmission purposes. It is specified by the Interface Index of the local PE serving the site. For route advertisement purposes, the NextHopInfo is preferably a specification of the PE and the user port to which the remote site interface is connected thereby leading to the next network hop towards a given IP prefix for packet transmission purposes across the network.

In the preferred embodiment, all routes from the route reflectors are used as input to import rules/filters 304. In the preferred embodiment, the rule operates on all fields of the 6-tuple to provide maximum flexibility. However, if desired, the rule may operate on fewer fields. For each field, except the IPv4 prefix field, to be compared a corresponding mask is used. Preferably, if the mask is set, the value of the field is to be compared. If the mask is not set, no comparison is performed and the field is set to pass signifying that the route passed the filter and should be either imported or exported in accordance with the filter action. The field may also be set to pass if the comparison result is equal. For the IPv4 prefix field, a second mask which is preferably 32 bits long is used to match a given address to a common IP prefix. The IPv4 prefix mask is preferably applied to the IPv4 portion of the VPN address. The status of the IPv4 field is set to pass if the comparison result is equal. The filter action is invoked only if all fields of the 6-tuple are set to pass.

Thus, the generic specification for an import rule 304 is given by mask {0|1, 0|1, 0|1, 0|1, 32 bit mask for IPv4 Prefix, 0|1}, Value {*, *, *, *, *, *}, action=permit|deny However, the invention is not so limited and if desired the generic specification for an import rule may be expressed in any other suitable notation or nomenclature, for example, as a mathematical expression, as route map commands, and/or the like.

Thus, for example, to exclude all the routes originating from a particular site, for example site s1, the import rule is specified as $$\text{mask}\{0, 0, 1, 0, 0, 0\}, \text{value}\{0, 0, s1, 0, 0, 0\}, \text{action=reject} \quad (1)$$

This rule is preferably the default rule for all sites, wherein the site is s1. The rule prevents the possibility of re-advertisement to the CE thereby preventing a possible routing loop in the process.

For a site to accept routes with RT=rt1, the import rule is preferably specified as:

$$\text{mask}\{0, 1, 0, 0, 0, 0\}, \text{value}\{0, rt1, 0, 0, 0, 0\}, \text{action=permit} \quad (2)$$

Since in the above example, the RD mask is zero, therefore the RD field comparison would be set to pass. The RT mask is one, therefore the RT comparison is performed and only set to pass if rt1=rt1, which in this case is true. For each of the remaining fields the mask value is zero, therefore the field comparison would be set to pass. This results in a tuple, such as {PASS, PASS, PASS, PASS, PASS, PASS}, in which case the action should be applied to the route. The import rules (1) and (2) may be used as default rules if there is no other routing policy involved.

Remote export rules 306 preferably associate a particular route from the route reflectors with information items, such as RD, RT, SOO, VPN_ID, IPv4 prefix, NextHopInfo, and/or the like. Remote export rules 306 are preferably used to perform re-advertisement of the routes to the route reflector with optionally different NextHopInfo. This is accomplished in part by attaching a different RD to the routes in order to avoid duplication inside the route reflector. In the preferred embodiment, routes advertised from the route reflectors are used as input to remote export rules 306. The accepted routes are preferably advertised to the route reflectors from where the routes were obtained with a different RD and different next hop information. Preferably, the next hop information in a remote export rule is configured by MCS 201. Preferably, routes are re-advertised to the same VPN only and not re-advertised across VPN boundaries. Any routes which are not accepted are discarded, for example, routes from the same site are typically discarded.

Local export rules 308 preferably associate a particular IPv4 route from PE-CE routing protocol with information items, such as RD, RT, SOO, VPN_ID, IPv4 prefix, NextHopInfo, and/or the like. In the preferred embodiment, routes obtained from the PE-CE routing protocol are used as input to local export rules 308. The accepted routes are preferably exported to the proper route reflector. Preferably, the next hop information in a local export rule is automatically generated. Any routes which are not accepted are discarded, for example, routes from the same site are typically discarded.

The generic specification for a remote export rule 306 and a local export rule 308 is given by:

mask {0|1, 0|1, 0|1, 0|1, 32 bit mask for IPv4 Prefix, 0|1}, Value {*, *, *, *, *, *}, action=reject|accept with {RD, RT, SOO, VPN_ID, =, NH}.

However, the invention is not so limited and if desired the generic specification for a remote export rule and a local export rule may be expressed in any other suitable notation or nomenclature, for example, as a mathematical expression, as route map commands, and/or the like.

The "=" signifies that the IPv4 Prefix is the same as that of the input rule. NH signifies the next hop information to be attached.

Thus, for example, in order to export the local obtained routes from port portB with rt1, rtd, to VPN v1, the local export rule is specified as follows:

mask {0, 0, 0, 0, 0, 0}, value {0, 0, 0, 0, 0, 0}, action=permit with {rtd, rt1, siteB, v1, =, NH}, where NH is the next hop for the route. Preferably, this is the Interface Index for the local port of the PE connected to the site from where the particular route is obtained, for example, the port serving siteB, and the advertising PE EVPR address.

Preferably, routes from a particular route reflector are not distributed back to the same route reflector. Thus, the exclusion rule for routes obtained from the route reflector is preferably specified as a default rule of the form:

mask {0, 0, 0, 0, 0, 0}, value {0, 0, 0, 0, 0, 0}, action=deny.

In the preferred embodiment, firewall operations require the redistribution of the routes from the route reflector. One or more default exclusion rules may be used for this purpose. An exemplary remote export rule that may be used is specified below:

mask {0, 0, 0, 0, 0, 1}, value {0, 0, 0, 0, 0, Z}, action=deny, where Z is the next hop specification for a local port of the site. Preferably, a list of such exclusion rules is desirable for each possible value of Z.

Figure 4:
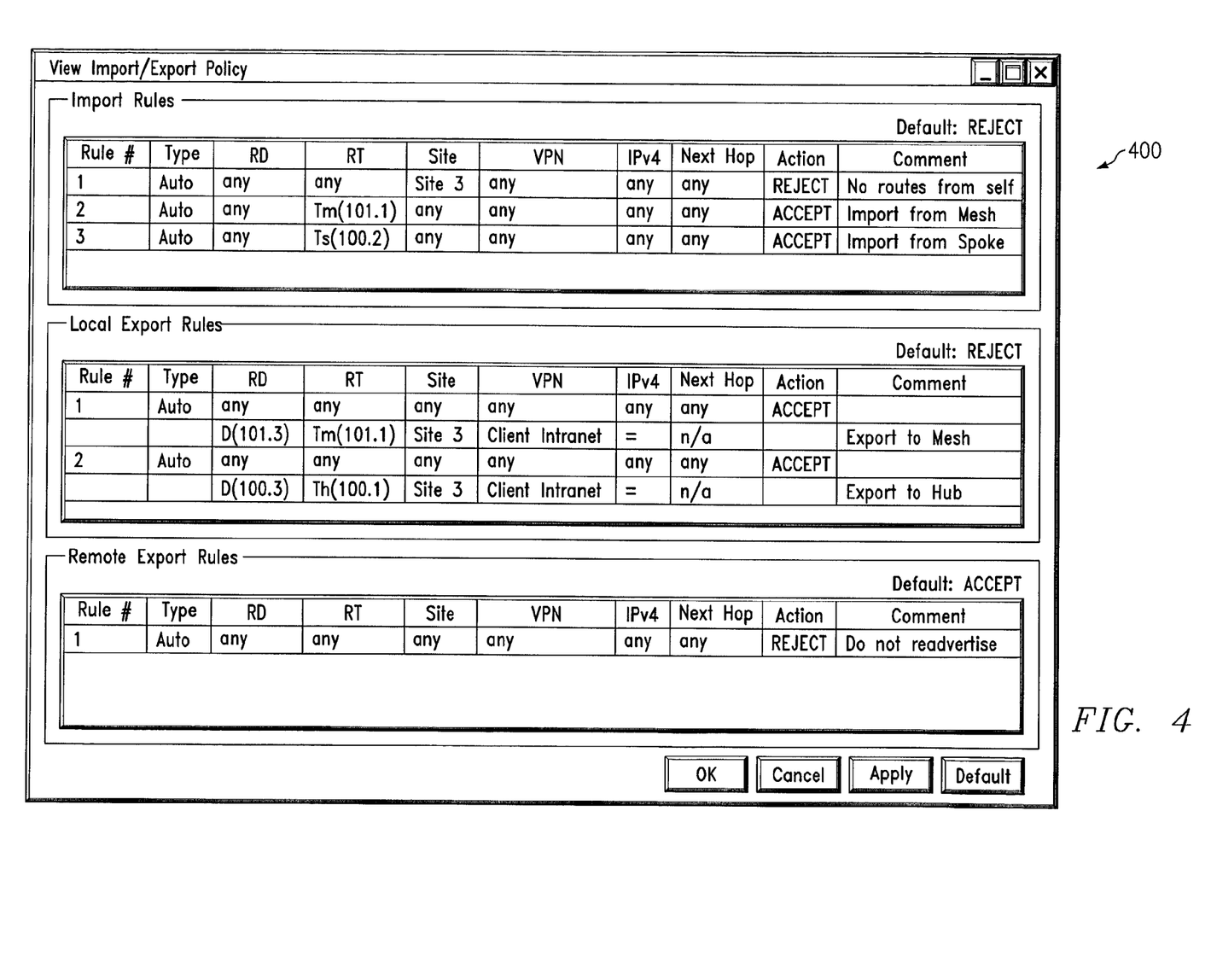
FIG. 4 shows an exemplary screen display of routing policy for a site of the network of FIG. 1.

FIG. 4 shows an exemplary screen display of routing policy 400 for a site of the network of FIG. 1. The routing policy as shown in FIG. 4 specifies the routing policy for site 3 of FIG. 1. The routing policy table has a plurality of columns, such as rule number, type, RD, RT, Site, VPN, IPv4, Next Hop, Action, Comment and/or the like. MCS 201 preferably automatically generates a routing policy table for each site of the VPN based at least in part on the provisioning operator's intent as specified graphically by the provisioning operator utilizing user interface 200. The routing policy table is generated by MCS 201 based at least in part on the policies discussed herein especially with reference to FIGS. 1-3, 5 and 6A-6D.

As shown in FIG. 4, the import rules/filters section has three (3) rules. As can be seen from the comment section for rule number 1, if a particular site receives route information from itself, that information is discarded. This is specified in the table by setting different values for the different columns. An "Auto" value in the type column indicates that the rule was automatically generated by MCS 201 based on the graphical provisioning performed by the provisioning operator. Thus, rule 1 specifies that for any route coming in which matches any RD and any RT, but where the site of origin is the same site as the site being specified, for example in the illustrated embodiment site 3, the action taken is a "Reject", that is the route is discarded.

Since site 3 is a member of VPN component 2, which is a mesh, rule number 2 of the import rules section specifies that if any routes are received from any site in the mesh, then the action taken by site 3 is an "Accept", that is any routes advertised on the mesh are imported by site 3. Thus, rule 2 specifies that any routes that are advertised in the mesh with a particular Route Target, for example Tm(101.1), are imported. The Tm in the RT column stands for target mesh.

Since site 3 is a hub for VPN component 1, which is a hub-spoke, rule number 3 of the import rules section specifies that if any routes are received from any spoke site in the hub-spoke, then the action taken by site 3 is an "Accept", that is any routes advertised on the hub-spoke by a spoke are imported by site 3. Thus, rule 3 specifies that any routes that are advertised in the hub-spoke with a particular Route Target, for example Ts(100.2), are imported. The Ts in the RT column stands for target spoke.

As shown in FIG. 4, since site 3 is a member of two VPN components, the local export rules/filters section for site 3 has two (2) rules. In general, any member of a mesh VPN component may advertise routes using the same RT. Therefore, preferably the RT value for rule 2 of the import rules is the same as the RT value for rule 1 of the local export rules. However, in the case of a hub-spoke, two RT values are employed. The spokes advertise to the first RT, say Ts(y), but import from the second RT, say Th(x). On the other hand, the hub advertises to the second RT, say Th(x), but imports from the first RT, say Ts(y), which is how all spokes have advertised their routes. Thus, preferably the RT value for rule 3 of the import rules is different from the RT value of rule 2 of the local export rules.

Line 1 of rule number 1 specifies that site 3 will accept any route that is coming in and line 2 of rule number 1 specifies that site 3 will advertise those routes to the mesh Route Target. As illustrated in line 2 of rule number 1, the routes are advertised with a value of 101.3 as the Route Distinguisher; a value of 101.1 as the Route Target; site 3 as the site of origin; the client intranet as the VPN; and the IPv4 address that is being advertised. An "=" value in the IPv4 address field indicates that the value of IPv4 address that is advertised in not changed.

Line 1 of rule number 2 of the local export rules specifies that site 3 will accept any route that is coming in and line 2 of rule number 2 specifies that site 3 will advertise those routes to the hub Route Target. As illustrated in line 2 of rule number 2, the routes are advertised with a value of 100.3 as the Route Distinguisher; a value of 100.1 as the Route Target; site 3 as the site of origin; the client intranet as the VPN; and the IPv4 address that is being advertised. An "=" value in the IPv4 address field indicates that the value of IPv4 address that is advertised in not changed.

The remote export rules specify which routes from which VPN components may be advertised to other VPN components thereby bridging different VPN components of a VPN. In the example illustrated in FIG. 4 routes from one VPN component are not advertised to other VPN components. However, the invention is not so limited and if desired, routes from one VPN component may be advertised on other VPN components.

Figure 5:
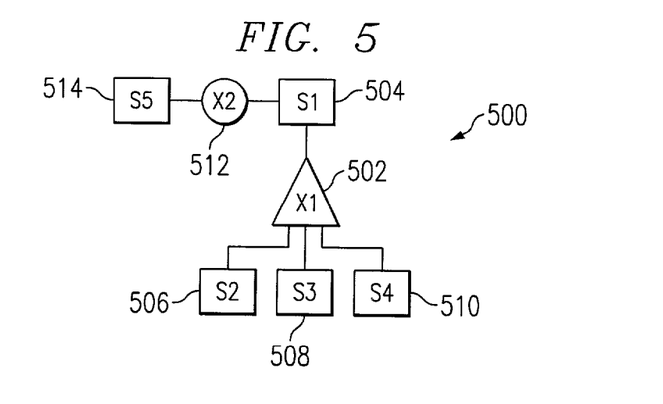
FIG. 5 shows a schematic diagram of an exemplary VPN.

FIG. 5 shows a schematic diagram of an exemplary VPN 500. VPN 500 comprises a hub-spoke VPN component X1 (502) with site S1 (504) as the hub and sites S2 (506), S3 (508), and S4 (510) as the spokes. VPN 500 also comprises a mesh VPN component X2 (512) with sites Si (504) and S5 (514) as members of the mesh.

FIGS. 6A-6D show the various stages in the provisioning of the exemplary VPN of FIG. 5 according to a preferred embodiment of the present invention. The following terminology is used with respect to FIGS. 6A-6D. A customer is denoted as C1. A VPN for customer C1 is denoted as C1V1. A component of VPN C1V1 is denoted as C1V1X1. The Route Distinguisher for component C1V1X1 is denoted as C1V1X1D. A Route Target for a hub of component C1V1X1 is denoted as C1V1X1Th and a Route Target for a spoke of component C1V1X1 is denoted as C1V1X1Ts. A Route Target for a mesh VPN component C1V1X1 is denoted as C1V1X1Tm. A site for customer C1 is denoted as C1S1.

Figure 6A:
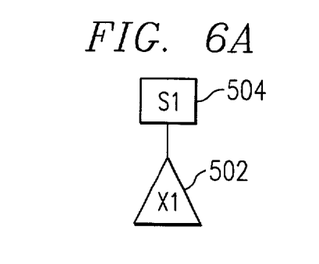
FIGS. 6A-6D show the various stages in the provisioning of the exemplary VPN of FIG. 5 according to a preferred embodiment of the present invention.

FIG. 6A shows the addition of site C1S1 as a hub of VPN component C1V1X1. The routing policy comprises of two import rules IF1 and IF2; one local export rule EL1; and one remote export rule ER1.

The import rules for site C1S1 are preferably specified as
IF1 {0, 0, C1S1, 0, 0, 0}->Reject; /* no routes from self (default) */
IF2 {0, C1V1X1Ts, 0, 0, 0, 0}->Accept; /* import routes from spoke */
The export rules for site C1S1 are preferably specified as
EL1 {0, 0, 0, 0, 0, 0}->Accept with {C1V1X1D, C1V1X1Th, C1S1, C1V1, =, 0}; /* export routes to hub */
ER1 {0, 0, 0, 0, 0, 0}->Reject; /* do not readvertise */

Figure 6B:
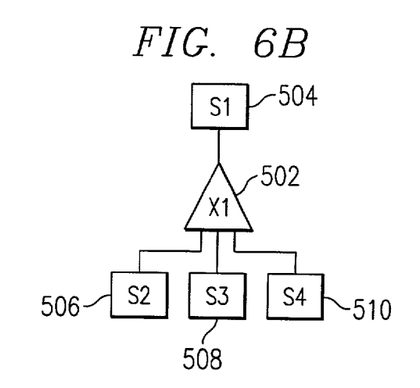

FIG. 6B shows the addition of sites C1S2, C1S3, and C1S3 as spokes of VPN component C1V1X1. The routing policy for each of the sites comprises of two import rules IF1 and IF2; one local export rule EL1; and one remote export rule ER1.

The import rules for site C1S2 are preferably specified as
IF1 {0, 0, C1S2, 0, 0, 0}->Reject; /* no routes from self (default) */
IF2 {0, C1V1X1Th, 0, 0, 0, 0}->Accept; /* import routes from hub */
The export rules for site C1S2 are preferably specified as
EL1 {0, 0, 0, 0, 0, 0}->Accept with {C1V1X1D, C1V1X1Ts, C1S2, C1V1, =, 0}; /* export routes to spoke */
ER1 {0, 0, 0, 0, 0, 0}->Reject; /* do not readvertise */
The import rules for site C1S3 are preferably specified as
IF1 {0, 0, C1S3, 0, 0, 0}->Reject; /* no routes from self (default) */
IF2 {0, C1V1X1Th, 0, 0, 0, 0}->Accept; /* import routes from hub */
The export rules for site C1S3 are preferably specified as
EL1 {0, 0, 0, 0, 0, 0}->Accept with {C1V1X1D, C1V1X1Ts, C1S3, C1V1, =, 0}; /* export routes to spoke */
ER1 {0, 0, 0, 0, 0, 0}->Reject; /* do not readvertise */
The import rules for site C1S4 are preferably specified as
IF1 {0, 0, C1S4, 0, 0, 0}->Reject; /* no routes from self (default) */
IF2 {0, C1V1X1Th, 0, 0, 0, 0}->Accept; /* import routes from hub */
The export rules for site C1S4 are preferably specified as
EL1 {0, 0, 0, 0, 0, 0}->Accept with {C1V1X1D, C1V1X1Ts, C1S4, C1V1, =, 0}; /* export routes to spoke */
ER1 {0, 0, 0, 0, 0, 0}->Reject; /* do not readvertise */

Figure 6C:
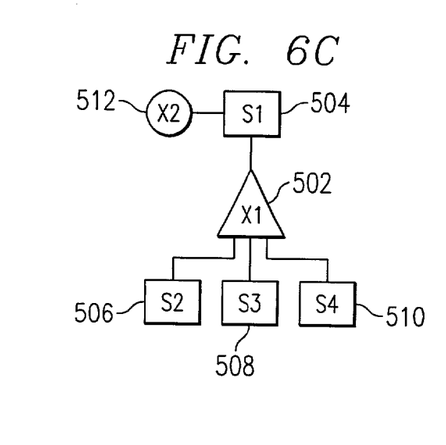

FIG. 6C shows the creation of mesh VPN component C1V1X2 and the addition of site C1S1 as a member of mesh VPN component C1V1X2. Appropriate identifiers, such as Route Distinguisher C1V1X2D and Route Targets C1V1X2Tm and C1V1X2Ts are allocated for the component. Mesh VPN component C1V1X2 only uses a single Route Target C1V1X2Tm. However, Route Target C1V1X2Ts is also allocated in case the component is changed from a mesh VPN component to a hub-spoke VPN component.

The routing policy for the addition of site C1S1 to mesh VPN component C1V1X2 comprises three import rules IF1, IF2 and IF3; two local export rules EL1 and EL2; and one remote export rule ER1.

The import rules for site CISI are preferably specified as

IF1 {0, 0, C1S1, 0, 0, 0}->Reject; /* no routes from self (default) */

IF2 {0, C1V1X1Ts, 0, 0, 0, 0}->Accept; /* import routes from X1 spoke */

IF3 {0, C1V1X2Tm, 0,0,0,0}->Accept; /* import routes from X2 mesh */

The export rules are preferably specified as

EL1 {0,0,0,0,0,0}->Accept with {C1V1X1D, C1V1X1Th, C1S1, C1V1, =, 0}; /* export routes to hub */

EL2 {0,0,0,0,0,0}->Accept with {C1V1X2D, C1V1X2Tm, C1S1, C1V1, =, 0}; /* export routes to X2 mesh */

ER1 {0,0,0,0,0,0}->Reject; /* do not readvertise */

Figure 6D:
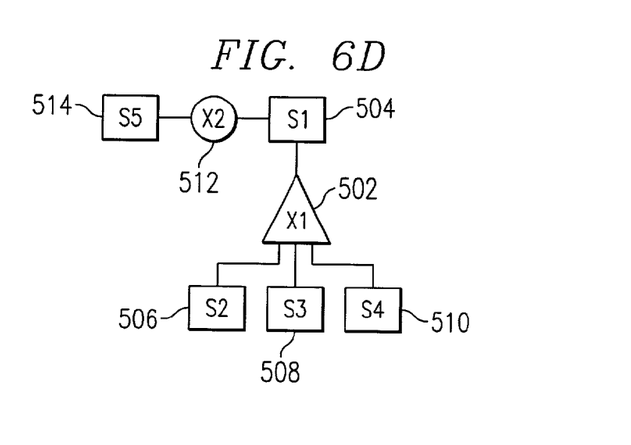

FIG. 6D shows the addition of site C1S5 as a member of mesh VPN component C1V1X2. The routing policy for the addition of site C1S5 to mesh VPN component C1V1X2 comprises of two import rules IF1 and IF2; one local export rule EL1; and one remote export rule ER1.

The import rules for site C1S5 are preferably specified as

IF1 {0, 0, C1S5, 0, 0, 0}->Reject; /* no routes from self (default) */

IF2 {0, C1V1X2Tm, 0,0,0,0}->Accept; /* import routes from X2 mesh */

The export rules are preferably specified as

EL1 {0,0,0,0,0,0}->Accept with {C1V1X2D, C1V1X2Tm, C1S5, C1V1, =, 0}; /* export routes to X2 mesh */

ER1 {0,0,0,0,0,0}->Reject; /* do not readvertise */

In some cases it may be desirable to create routing policy to share routes between different VPN components of a VPN, for example VPN components C1V1X1 and C1V1X2 of VPN C1V1. Since site C1S1 is a member of both VPN components C1V1X1 and C1V1X2, one or more rules of site C1S1 (as shown above with reference to FIG. 6C) may be modified to allow sharing of routes between the different components. In the preferred embodiment, the remote export rules are modified.

Thus, preferably the following remote export rule is deleted:

ER1 {0, 0, 0, 0, 0, 0}->Reject; /* do not readvertise */.

The following remote export rules are added:

ER1 {0, 0, 0, 0, 0, PE-C1S1}->Reject; /* do not advertise if the site's PE is already the next hop */

ER2 {0, C1V1X1Ts, 0, 0, 0, 0}->Accept with {C1V1X2D, C1V1X2Tm, =, =, =, PE-C1S1}; /* Reflect X1 routes into X2 marking the site's local PE as the next hop */

ER3 {0, C1V1X2Tm, 0, 0, 0, 0}->Accept with {C1V1X1D, C1V1X1Th, =, =, =,PE-C1S1}; /* Reflect X2 routes into X1 marking the site's local PE as the next hop */

In some cases, it may be desirable to change the routing policy so that the different components of a VPN may no longer share routes, for example VPN components C1V1X1 and C1V1X2 of VPN C1V1. Since site C1S1 is a member of both VPN components C1V1X1 and C1V1X2, one or more rules of site C1S1 (as shown above with reference to FIG. 6C) may be modified to prevent sharing of routes between the different components. In the preferred embodiment, the remote export rules are modified.

Thus, preferably the following remote export rules are deleted:

ERI {0, 0, 0, 0, 0, PE-C1S1}->Reject; /* do not advertise if the site's PE is already the next hop */

ER2 {0, C1V1X1Ts, 0, 0, 0, 0}->Accept with {C1V1X2D, C1V1X2Tm, =, =, =, PE-C1S1}; /* Reflect X1 routes into X2 marking the site's local PE as the next hop */

ER3 {0, C1V1X2Tm, 0, 0, 0, 0}->Accept with {C1V1X1D, C1V1X1Th, =, =, =, PE-C1S1}; /* Reflect X2 routes into X1 marking the site's local PE as the next hop */

The following remote export rule is added:

ERI {0, 0, 0, 0, 0, 0}->Reject; /* do not readvertise */

Thus, in the preferred embodiment, MCS 201 captures the intent of the provisioning operator as graphically expressed through the user interface and automatically translates it to provide topology constrained routing policy provisioning.

While the invention has been particularly shown and described by the foregoing detailed description, it will be understood by those skilled in the art that various other changes in form and detail may be made without departing from the spirit and scope of the invention.

What is claimed is:

1. A method for provisioning routing policy of a plurality of customer sites of a Virtual Private Network (VPN) in a packet switched network, the VPN established at least in part by constraining distribution of VPN routes within the network, comprising:

graphically defining on the computer at least one topological relationship between said plurality of sites of said VPN, the at least one topological relationship defining permitted communication between the plurality of sites without explicit reference to links between routers of the underlying physical network; and automatically generating at least one route distribution rule for provisioning to a router in the network based at least in part on said defined relationship, the at least one route distribution rule constraining at least in part distribution by the router at the at least one of the plurality of sites of the VPN routes within the network.

2. The method of claim 1, wherein automatically generating at least one route distribution rule comprises:

automatically generating at least one import rule;
automatically generating at least one local export rule; and
automatically generating at least one remote export rule.

3. The method of claim 1, wherein automatically generating at least one route distribution rule for each site comprises generating an import rule for discarding route information received from the respective site.

4. The method of claim 1, further comprising designating a VPN component, the VPN component representing permitted communication between the sites in the plurality of sites that are members of the VPN component, without explicit reference to links between physical elements of the underlying packet switched network; wherein automatically generating at least one route distribution rule comprises generating, for a site of said plurality of sites, an import rule for accepting route information, in response to said site being a member of a mesh VPN component, received from any site of said plurality of sites which is a member of said mesh VPN component.

5. The method of claim 1, further comprising designating a VPN component, the VPN component representing permitted communication between the sites in the plurality of sites that are members of the VPN component, without explicit reference to links between physical elements of the underlying packet switched network; wherein automatically generating at least one route distribution rule comprises generating, for a site of said plurality of sites, an import rule for accepting route information, in response to said site being a hub of a hub-spoke VPN component, received from any site of said plurality of sites which is a member of said hub-spoke VPN component.

6. The method of claim 1, wherein automatically generating at least one route distribution rule comprises generating, for a site of said plurality of sites, an import rule for accepting route information, in response to said site being a spoke of a hub-spoke VPN component, received from any site of said plurality of sites which is a hub of said hub-spoke VPN component; the hub-spoke VPN component representing permitted communication between the sites in the plurality of sites that are members of the hub-spoke VPN component, without explicit reference to links between physical elements of the underlying packet switched network.

7. The method of claim 1, further comprising graphically designating at least one VPN component, further comprising graphically designating a VPN component, the VPN component representing permitted communication between the sites in the plurality of sites that are members of the VPN component, without explicit reference to links between physical elements of the underlying packet switched network; wherein automatically generating at least one route distribution rule comprises automatically generating at least one local export rule, wherein the number of local export rules generated is at least equal to the number of VPN components of said VPN that the respective site is a member of.

8. The method of claim 1, wherein automatically generating at least one route distribution rule comprises:
graphically designating a VPN component, the VPN component representing permitted communication between the sites in the plurality of sites that are members of the VPN component, without explicit reference to links between physical elements of the underlying packet switched network;
generating, for a site of said plurality of sites in response to said site being a member of a mesh VPN component, a local export rule for:
accepting routes from a Provider Edge-Customer Edge (PE-CE) routing protocol;
associating route information of said VPN to said accepted routes; and
advertising said accepted routes and said route information to all members of said mesh VPN component.

9. The method of claim 1, wherein automatically generating at least one route distribution rule comprises:
generating, for a site of said plurality of sites in response to said site being a hub of a hub- spoke VPN component, a local export rule for:
accepting routes from a Provider Edge-Customer Edge (PE-CE) routing protocol;
associating route information of said VPN to said accepted routes; and
advertising said accepted routes and said route information to all members of said hub-spoke VPN component;
the hub-spoke VPN component representing a permitted communication between the plurality of customer sites without explicit reference in the graphical definition of the VPN to links between physical elements of the underlying packet switched network.

10. The method of claim 1, wherein automatically generating at least one route distribution rule comprises:
generating, for a site of said plurality of sites in response to said site being a spoke of a hub-spoke VPN component, a local export rule for:
accepting routes from a Provider Edge-Customer Edge (PE-CE) routing protocol;
associating route information of said VPN to said accepted routes; and
advertising said accepted routes and said route information to all members of said hub-spoke VPN component;
wherein, the hub-spoke VPN component represents permitted communication between the plurality of sites without explicit reference in the graphical definition of the VPN to links between physical elements of the underlying packet switched network.

11. The method of claim 1, wherein automatically generating at least one route distribution rule comprises:
generating, for a site of said plurality of sites in response to said site being a member of a VPN component, a plurality of local export rules for:
accepting routes from a Provider Edge-Customer Edge (PE-CE) routing protocol;
associating at least two sets of route information of said VPN to said accepted routes; and
advertising said accepted routes and said route information to members of said respective VPN component;
wherein the VPN component represents permitted communication between the plurality of sites without explicit reference in the graphical definition of the VPN to links between physical elements of the underlying packet switched network.

12. The method of claim 1, wherein automatically generating at least one route distribution rule for each site comprises generating a remote export rule for not advertising route information received from a site which is a member of a VPN component to a site which is not a member of said VPN component, said VPN component representing permitted communication between the sites in the plurality of sites that are members of the VPN component, without explicit reference in the graphical definition of the VPN to links between physical elements of the underlying packet switched network.

13. The method of claim 1, wherein automatically generating at least one route distribution rule for each site comprises generating, for a site of said plurality of sites in response to said site being a member of at least two VPN components, a remote export rule for advertising route information received from a site which is a member of a first VPN component of said at least two VPN components to at least one site which is not a member of said first VPN component; each VPN component representing permitted communication between the sites in the plurality of sites that are members of the VPN component, without explicit reference to links between physical elements of the underlying packet switched network.

14. The method of claim 1, further comprising storing said at least one route distribution rule in a database.

15. The method of claim 1, wherein the VPN routes establish label-switched paths through the network between the plurality of sites.

16. A system for provisioning routing policy of a plurality of customer sites of a Virtual Private Network (VPN), in a packet switched network, the VPN established at least in part by constraining distribution of VPN routes within the network, and the plurality of customer sites including at least three sites; the system comprising:
a graphical user interface, comprising:
a display area graphically displaying at least one VPN component of said VPN, the VPN component representing permitted communication between sites included in the plurality of customer sites that are members of the VPN component, without explicit reference to links between physical elements of the underlying packet switched network, the VPN component being chosen from a group comprising a mesh configuration component and hub and spoke configuration component; and a customer area displaying said plurality of sites, at least one of said plurality of sites operable to be dragged from said customer area to said display area, wherein dropping of said at least one site on a graphical representation of said at least one VPN component causes said at least one site to be displayed in said display area and to become a member of said VPN component and automatically generating at least one route distribution rule for constraining distribution of routes the at least one of said plurality of sites.

17. The system of claim 16, further comprising means for distributing said generated route distribution rule to a respective one of said plurality of sites of said VPN component.

18. The system of claim 17, further comprising means for processing, by each site, route information received from said plurality of sites based at least in part on said at least one route distribution rule.

19. The system of claim 18, further comprising means for establishing routing relations between said plurality of sites based at least in part on said processed routing information.

20. The system of claim 16, further comprising a database operable to store said at least one route distribution rule.

21. A method for provisioning routing policy of a plurality of customer sites of a Virtual Private Network (VPN), in a packet switched network, the VPN established at least in part by constraining distribution of VPN routes within the network, comprising:
graphically displaying at least one VPN component of said VPN; enabling dragging of a representation of at least one site of said plurality of sites towards said at least one VPN component;
enabling dropping of said representation of said at least one site on said representation of said at least one VPN component thereby causing said site to become a member of said VPN component; and
automatically generating at least one route distribution rule for provisioning to each site of said plurality of sites based at least in part on a membership of said respective site, the at least one route distribution rule constraining at least in part distribution of the VPN routes within the network; and
storing said at least one route distribution rule and route information received from said plurality of sites in a database;
wherein said route information comprises at least one route information item selected from the group consisting of a Route Distinguisher (RD), a Route Target (RT), a Site of Origin (SOO), a VPN ID, an Internet Protocol version 4 (IPv4) Prefix, and Next Hop Information (NH).

22. The method of claim 21, wherein said route information is denoted by a 6-tuple {RD, RT, SOO, VPN_ID IPv4 Prefix, NH}, wherein RD denotes a Route Distinguisher, RT denotes a Route Target, SOO denotes a Site of Origin, VPN_ID denotes a VPN ID, IPv4 Prefix denotes an Internet Protocol version 4 prefix, and NH denotes Next Hop Information.

23. The method of claim 21, wherein automatically generating at least one routing rule comprises generating a routing rule for discarding route information received from site s1, said routing rule being denoted as mask {0, 0, 1, 0, 0, 0}, value {0, 0, s1, 0, 0, 0}, action=reject.

24. The method of claim 22, wherein automatically generating at least one routing rule comprises generating a routing rule for accepting route information comprising a specified Route Target rt1, said second routing rule being denoted as mask {0, 1, 0, 0, 0, 0}, value {0, rt1, 0, 0, 0, 0}, action=permit.

25. The method of claim 22, wherein automatically generating at least one routing rule comprises:
automatically generating at least one local export rule and at least one remote export rule, said at least one local export rule and said at least one remote export rule being generically denoted by: mask {0|1, 0|1, 0|1, 0|1, 32 bit mask for IPv4 Prefix, 0|1}, Value {*, *, *, *, *, *}, action=reject accept with {RD, RT, SOG, VPN_ID, =, NH}.

26. A method for provisioning routing policy of a plurality of customer sites of a virtual private network (VPN) within a packet switched network, the plurality of customer sites including at least three customer sites, and the VPN being established at least in part by constraining distribution of VPN routes within the network; the method comprising
graphically displaying a representation of at least one VPN component of said VPN, the VPN component representing a permitted communication between at least two of the plurality of customer sites without explicit reference to physical elements of the packet switched network;
enabling graphically indicating, using a graphical representation of at least one site of said plurality of sites and said graphically displayed representation at least one VPN component, that said at least one site is to become a member of said VPN component; and
automatically generating at least one route distribution rule for provisioning to at least one physical device comprising the packet switched network, the at least one route distribution rule constraining at least in part distribution of the VPN routes within the network based on the indication of membership of the at least one site in said at least one VPN component.

27. The method of claim 26, wherein the VPN routes establish label-switched paths through the network between the plurality of sites.

28. The method of claim 26, wherein automatically generating at least one route distribution rule comprises:
automatically generating at least one import rule; and
automatically generating at least one export rule.

29. The method of claim 26, wherein the VPN component is chosen from a group comprising a mesh configuration VPN component and hub and spoke configuration VPN component.

* * * * *